Figure 1:
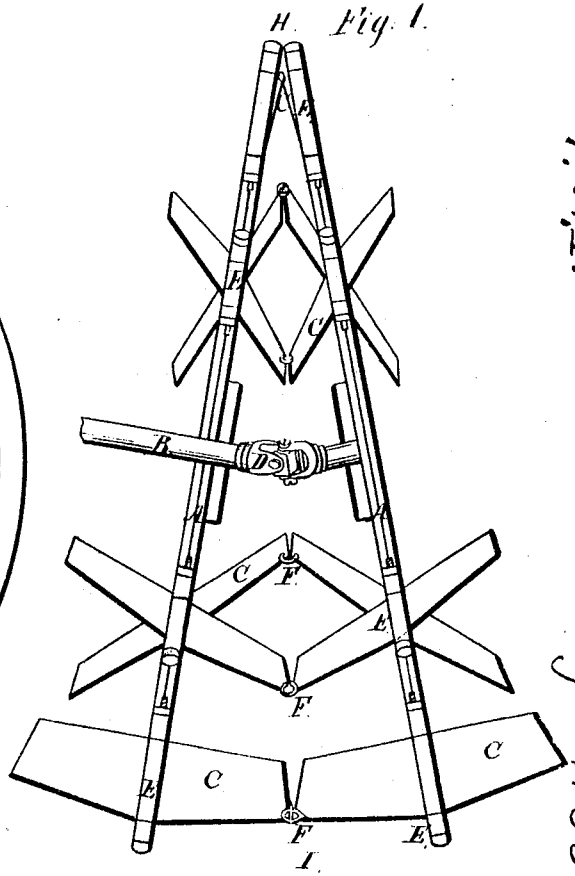
Figure 2:
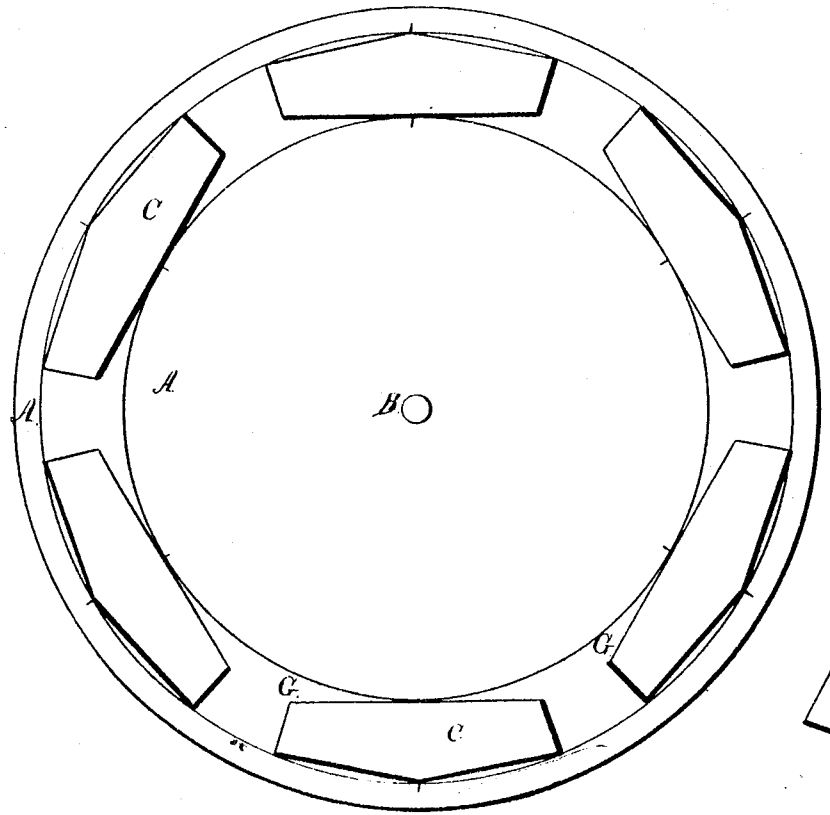
Figure 3:
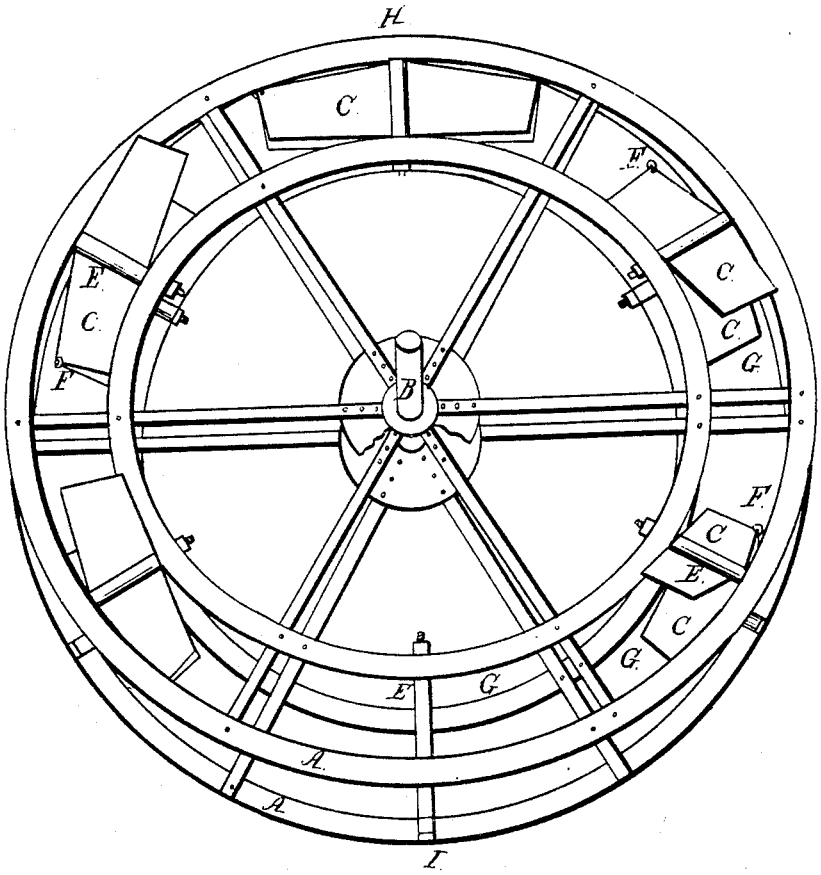

EXAMINER.

Sheet 1. 2 Sheets.

W. D. Jones.

Paddle Wheel.

BEST AVAILABLE COPY

No. 12 7. A.I. Patented Aug. 21, 1855.

Witnesses:
L. B. Sackett
A. M. Brush

Inventor:
William D. Jones

N. PETERS, PHOTO-LITHOGRAPHER, WASHINGTON, D. C.

EXAMINER.

BEST AVAILABLE COPY

Sheet 2. 2 Sheets.

W. D. Jones.

Paddle Wheel.

No. 12 7, A.I. Patented Aug. 21, 1855.

Witnesses:
L. B. Sackett
A. M. Brush

Inventor:
William D. Jones

H. PETERS, PHOTO-LITHOGRAPHER, WASHINGTON, D. C.